US 11,228,365 B1

(12) United States Patent
Desplat et al.

(10) Patent No.: US 11,228,365 B1
(45) Date of Patent: Jan. 18, 2022

(54) FIBER OPTIC LINK INTERMITTENT FAULT DETECTION AND LOCALIZATION

(71) Applicant: VIAVI SOLUTIONS INC., San Jose, CA (US)

(72) Inventors: Sylvain Desplat, Lyons (FR); François Le Luhern, Sainte Agathe la Bouteresse (FR)

(73) Assignee: VIAVI SOLUTIONS INC., San Jose, CA (US)

(*) Notice: Subject to any disclaimer, the term of this patent is extended or adjusted under 35 U.S.C. 154(b) by 0 days.

(21) Appl. No.: 17/069,446

(22) Filed: Oct. 13, 2020

(30) Foreign Application Priority Data

Sep. 9, 2020 (EP) ..................... 20305998

(51) Int. Cl.
*H04B 10/07* (2013.01)
*H04B 10/071* (2013.01)

(52) U.S. Cl.
CPC .................. *H04B 10/071* (2013.01)

(58) Field of Classification Search
CPC .............. H04B 10/071; H04B 10/0797; H04B 10/07955; H04J 14/0227
See application file for complete search history.

(56) References Cited

U.S. PATENT DOCUMENTS

| 7,630,641 | B1* | 12/2009 | Uhlhorn | H04B 10/071 398/28 |
| 8,682,158 | B2* | 3/2014 | Smith | H04J 3/0608 398/20 |
| 2012/0224846 | A1* | 9/2012 | Swanson | H04B 10/85 398/13 |
| 2018/0205455 | A1* | 7/2018 | Mattos | H04B 10/0797 |
| 2019/0137355 | A1* | 5/2019 | Nakatani | G01M 11/3136 |

* cited by examiner

*Primary Examiner* — Dzung D Tran
(74) *Attorney, Agent, or Firm* — Mannava & Kang, P.C.

(57) ABSTRACT

In some examples, fiber optic link intermittent fault detection and localization may include determining, for a fiber optic link that is to be analyzed, at least one section corresponding to the fiber optic link, at least one detection threshold corresponding to the at least one section, and a reference trace for the fiber optic link. A real-time trace may be acquired for the fiber optic link, and a comparison trace may be generated based on analysis of the reference trace and the real-time trace. Based on analysis of the at least one section to determine whether at least one comparison trace section level indicator determined from the comparison trace exceeds the at least one detection threshold, an event associated with the fiber optic link may be identified.

20 Claims, 13 Drawing Sheets

1200

```
┌─────────────────────────────────────────────────────────────────┐
│  DETERMINE, FOR A FIBER OPTIC LINK THAT IS TO BE ANALYZED, AT   │
│  LEAST ONE SECTION CORRESPONDING TO THE FIBER OPTIC LINK, AT    │
│  LEAST ONE DETECTION THRESHOLD CORRESPONDING TO THE AT          │
│  LEAST ONE SECTION, AND A REFERENCE TRACE FOR THE FIBER OPTIC   │
│                              LINK                                │
│                              1202                                │
└─────────────────────────────────────────────────────────────────┘
                                 ▼
┌─────────────────────────────────────────────────────────────────┐
│         ACQUIRE, FOR THE FIBER OPTIC LINK, A REAL-TIME TRACE     │
│                              1204                                │
└─────────────────────────────────────────────────────────────────┘
                                 ▼
┌─────────────────────────────────────────────────────────────────┐
│   GENERATE, BASED ON ANALYSIS OF THE REFERENCE TRACE AND THE    │
│   REAL-TIME TRACE, A COMPARISON TRACE FOR THE FIBER OPTIC LINK  │
│                              1206                                │
└─────────────────────────────────────────────────────────────────┘
                                 ▼
┌─────────────────────────────────────────────────────────────────┐
│  IDENTIFY, BASED ON ANALYSIS OF THE AT LEAST ONE SECTION, THE   │
│  COMPARISON TRACE, AND THE AT LEAST ONE DETECTION THRESHOLD,    │
│    AN EVENT ASSOCIATED WITH THE FIBER OPTIC LINK                │
│                              1208                                │
└─────────────────────────────────────────────────────────────────┘
```

*FIG. 12*

FIBER OPTIC LINK INTERMITTENT FAULT DETECTION AND LOCALIZATION

PRIORITY

The present application claims priority under 35 U.S.C. 119(a)-(d) to European patent application number 20305998.5, having a filing date of Sep. 9, 2020, the disclosure of which is hereby incorporated by reference in its entirety.

BACKGROUND

A fiber optic cable may include one or more optical fibers that may be used to transmit light from a source to a destination. Fiber optic cables may represent a network element of a fiber optic network. In this regard, other types of network elements may include optical connectors, optical splices, optical couplers, and optical switches. A fiber optic network may be monitored, for example, by a remote fiber monitoring system that enables oversight of an entire fiber optic network from a central location.

BRIEF DESCRIPTION OF DRAWINGS

Features of the present disclosure are illustrated by way of example and not limited in the following figure(s), in which like numerals indicate like elements, in which:

FIG. 12 illustrates a flowchart of an example method for fiber optic link intermittent fault detection and localization in accordance with an example of the present disclosure.

DETAILED DESCRIPTION

Figure 1:
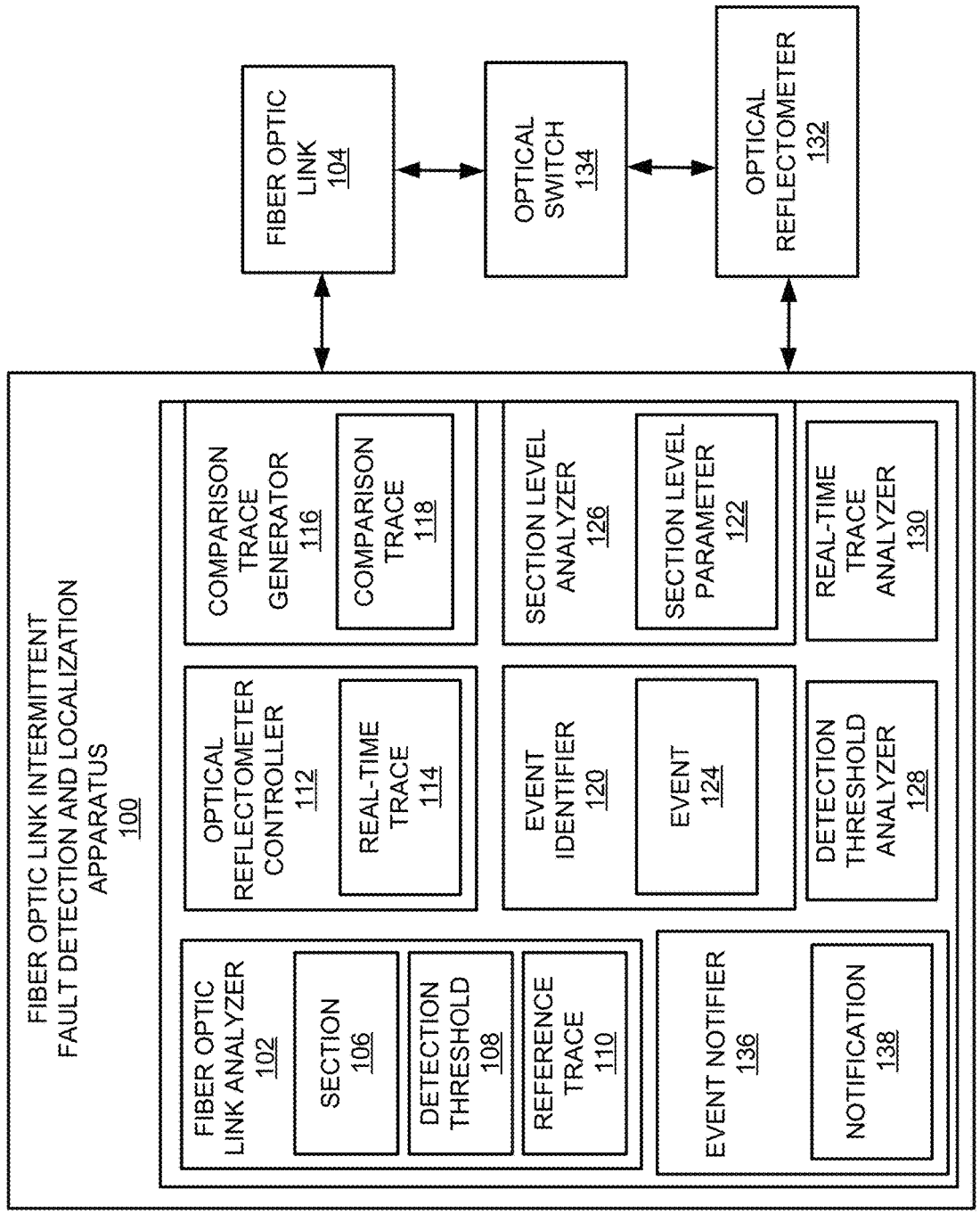
FIG. 1 illustrates an architectural layout of a fiber optic link intermittent fault detection and localization apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Fiber optic link intermittent fault detection and localization apparatuses, methods for fiber optic link intermittent fault detection and localization, and non-transitory computer readable media for fiber optic link intermittent fault detection and localization are disclosed herein. The apparatuses, methods, and non-transitory computer readable media disclosed herein provide for detection and location of short duration fiber optic link loss transients. For example, the optical link loss transients may represent unpredictable interruptions in the optical continuity of the fiber optic link which may be due, for example, to high insertion losses linked to intermittent optical contact of a connector forming part of the fiber optic link. The stresses on the fibers themselves such as for example bends may also generate temporary discontinuities in the physical link between optical transmitters and receivers. These phenomena may be described by a transient change from link established status to link broken status followed by a return to normal. This type of interruption in optical continuity is one of the potential causes of a flapping fiber optic link as disclosed herein. The apparatuses, methods, and non-transitory computer readable media disclosed herein may provide for detection of such interruptions.

As disclosed herein, a fiber optic network may be monitored, for example, by a remote fiber optic network monitoring system that enables oversight of an entire fiber optic network from a central location. In this regard, the performance of the fiber optic network may be continuously evaluated to minimize a value such as a mean time to repair (MTTR).

A fiber optic network monitoring system may utilize fiber optic reflectometers to monitor loss all along a fiber optic link. For example, an Optical Time Domain Reflectometer (OTDR) may utilize Rayleigh backscattering and Fresnel reflection signals to monitor events with respect to the fiber optic network. Due to the relatively low level of the Rayleigh signal, multiple acquisitions may need to be accumulated to obtain a useable trace to detect or accurately locate and characterize the events.

A fiber optic link may fail, for example, when the connection between two devices (on specific interfaces) is down. In some cases, short duration link failures may need to be identified.

With respect to short duration link failures, the time required to average multiple acquisitions may limit the detection of such intermittent and short duration faults (ISDF). Several seconds, tens of seconds, or even more time may be needed to obtain an acceptable signal-to-noise ratio of the OTDR traces to be used for event detection and localization. When the acquisition time is much greater than the fiber optic line interruption time, the impact of the optical fiber link fault may be undetectable and/or cannot be located. For example, for a complete cut in the optical fiber link lasting less than 5% of the averaging time, it is technically challenging to detect the resulting optical loss.

An OTDR based monitoring solution may include technical challenges when brief failures create spurious port or route flapping. In this regard, a fiber optic link flap may represent a condition where a communications link alternates between up and down states. These short duration traffic interruptions may occur due to fiber optic link failure, device failure, and other such factors. In applications such as data centers, network failures as well as the root causes thereof may need to be identified. In this regard, it is technically challenging to distinguish brief events due to intermittent fiber link discontinuities from other possible causes such as device failures or software issues.

The apparatuses, methods, and non-transitory computer readable media disclosed herein address at least the aforementioned technical challenges by associating each physical fiber optic link failure with traffic parameters observed on the fiber optic link in the recent past before the time of failure. The apparatuses, methods, and non-transitory computer readable media disclosed herein may detect and characterize fiber optic link failure with optical line switching from an up state to a down state, as well as characterize a potential root cause on the physical layer side such as an intermittent fiber optic link discontinuity.

According to examples disclosed herein, the apparatuses, methods, and non-transitory computer readable media disclosed herein may provide for detecting and locating short duration fiber optic link loss transients in an optical transmission system. For example, the apparatuses, methods, and non-transitory computer readable media disclosed herein may provide for detecting and locating very short duration loss variations in an optical transmission system.

With respect to the apparatuses, methods, and non-transitory computer readable media disclosed herein, OTDR based fiber monitoring systems may be deployed in telecom networks from core to access. In service monitoring solutions may be based on wavelength division multiplexing to monitor the telecom network at a specific wavelength different from the wavelength of the traffic. In this regard, U band (e.g., 1625 nm-1675 nm) may be a relatively popular wavelength range for monitoring systems. These solutions may be designed to detect small loss variations, and locate the variations with high resolution.

The combination of these two requirements to detect small loss variations and to locate the variations with high resolution may lead to select a minimum measurement time, and limit an analysis repetition rate to a few seconds and often tens of seconds. In these conditions, brief fiber link interruptions of 1 second and even less than 100 milliseconds may be technically challenging to detect.

In this regard, according to examples disclosed herein, the apparatuses, methods, and non-transitory computer readable media disclosed herein may represent an in-service solution to detect and locate short duration fiber optic link loss transients.

According to examples disclosed herein, the apparatuses, methods, and non-transitory computer readable media disclosed herein may combine a short duration and real time OTDR trace acquisition technique, and a high-speed local level analysis to first detect a fiber optic link budget loss, and then locate a fault using the full OTDR data set.

With respect to the apparatuses, methods, and non-transitory computer readable media disclosed herein, OTDR traces may be compared with reference traces to detect any significant variations in time to report deviations, and to reinstate alarms if needed. Primary parameters for comparison of reference traces may include loss variation sensitivity and fault location accuracy. These two parameters may drive the balance between distance resolution and dynamic range of the OTDR that is part of a monitoring system. After selecting the pulse width, the distance range and distance sampling resolution, the averaging time may remain as a primary parameter to adjust performances. In this regard, the signal-to-noise ratio (SNR) may increase with the square root of the averaging time.

Figure 2:
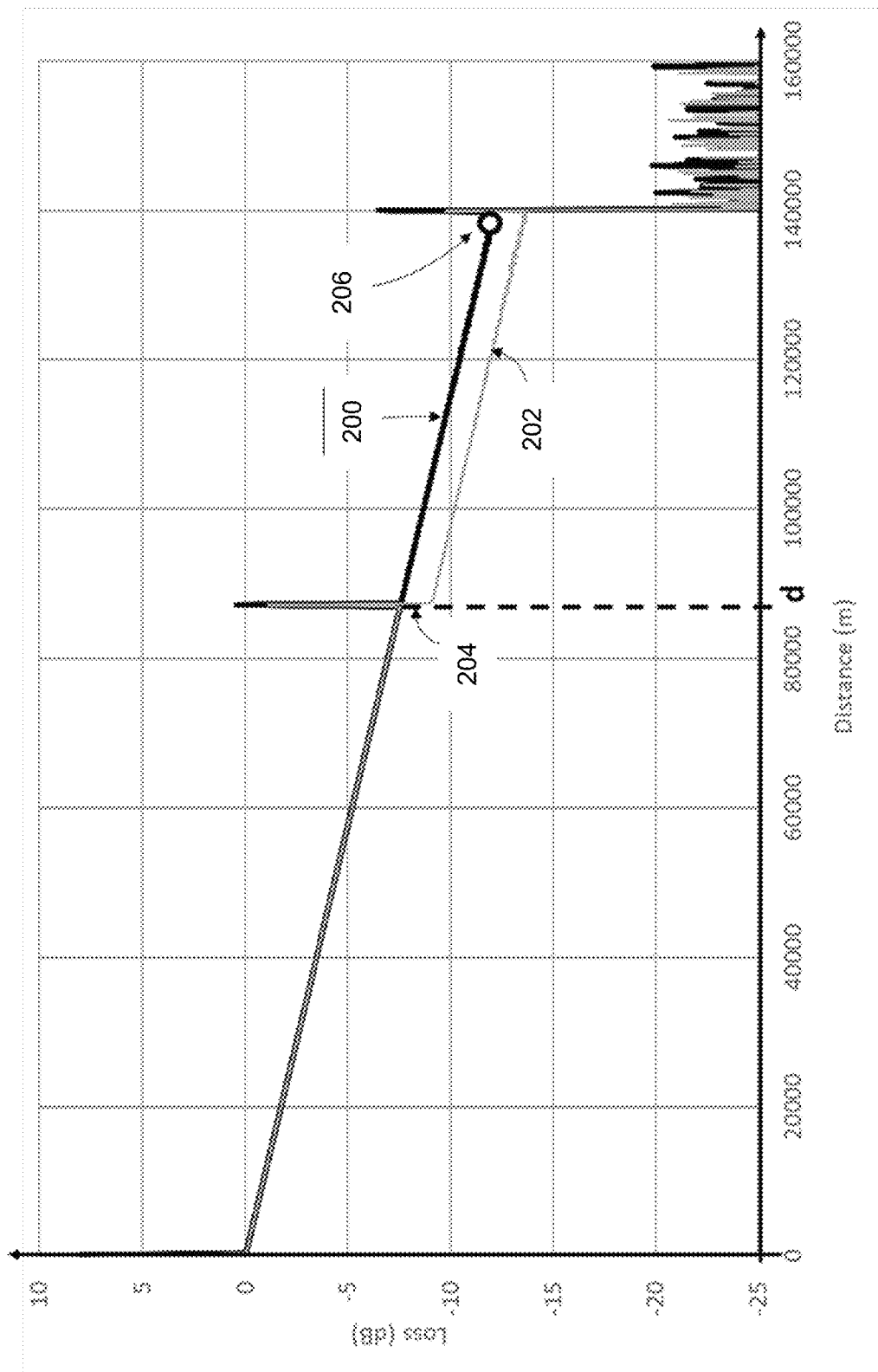
FIG. 2 illustrates two optical time-domain reflectometer (OTDR) traces to describe a comparison process between traces, in accordance with an example of the present disclosure.

For example, FIG. 2 illustrates two OTDR traces to describe a comparison process between traces, in accordance with an example of the present disclosure. The two superposed OTDR traces may describe the comparison process between a reference trace 200 and a current trace 202 showing an extra insertion loss 204 located at a distance d from the near end of an optical fiber link. The reference trace 200 may represent an OTDR trace acquired under conditions considered to be normal (e.g., representative of a fiber optic link presenting no visible problems). In general, the reference trace 200 may be validated by an operator who checks that this trace is indeed the image of the network in good working order. For the example of FIG. 2, the 140 km fiber link may be made of two sections connected together at distance d. This extra-loss may be due to an optical connector issue at distance d. The signal-to-noise ratio may be used to detect, locate and characterize this event (e.g., distance, loss, reflectance). An optic link budget may be monitored by a point loss measurement close to the end 206 of the optical fiber link. Any additional loss along the optical fiber link may impact the optic link budget and may be detected by monitoring a loss level.

According to an example, OTDR dynamic range specifications may be provided for a three minute averaging time. Reducing time averaging to a tenth of a second, which may be considered as a real-time mode condition, may lead to more than 8 dB loss of dynamic range that corresponds to distance range reduction of approximately 40 km for a single mode fiber operated at 1550 nm.

Figure 3:
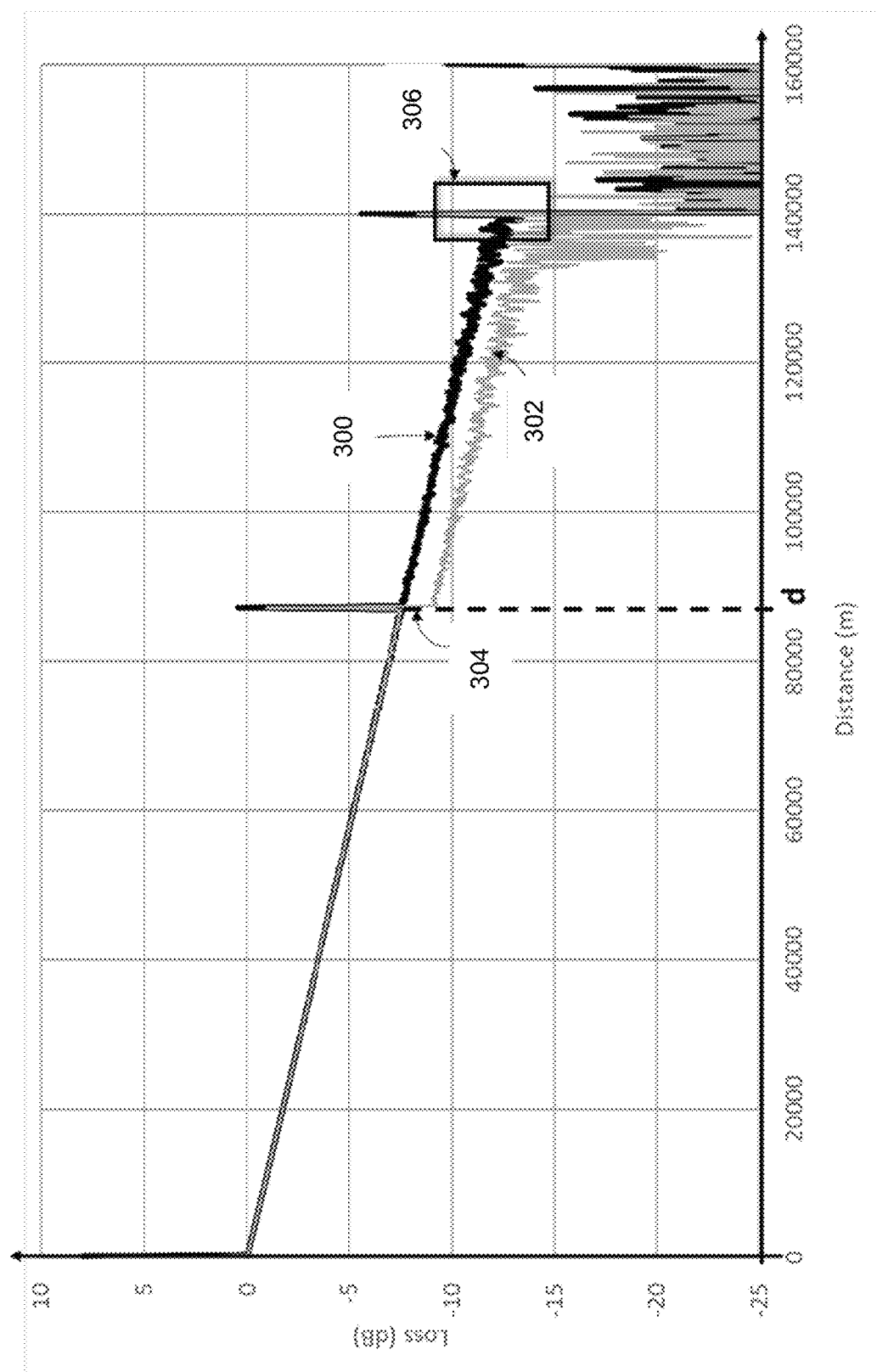
FIG. 3 illustrates OTDR traces with and without defects acquired after a short averaging time in comparison with the conditions of FIG. 2, in accordance with an example of the present disclosure.

FIG. 3 illustrates OTDR traces with and without defects acquired after a short averaging time in comparison with the conditions of FIG. 2, in accordance with an example of the present disclosure. Referring to FIG. 3, the two OTDR traces of FIG. 2 may include a relatively poor signal-to-noise ratio (SNR) because of a short averaging time. Under these conditions, the traces may become noisier depending on the increase of the optical loss. In this regard, an optical loss located over the last 10 km may be difficult to detect. A point loss measurement just before the end of the optical fiber link will may face poor SNR conditions that lead to relatively inaccurate budget loss measurement. The two OTDR traces may describe the comparison process between a reference trace 300 and a current trace 302 showing an extra insertion loss 304 located at a distance d from the near end of an optical fiber link. In this example, the loss is located at the level of a reflective peak representative of the presence of a connector at this location. This insertion loss may include a negative effect on the signal-to-noise ratio (e.g., trace 302 is noisier after the distance d compared to the reference trace 300).

Figure 4:
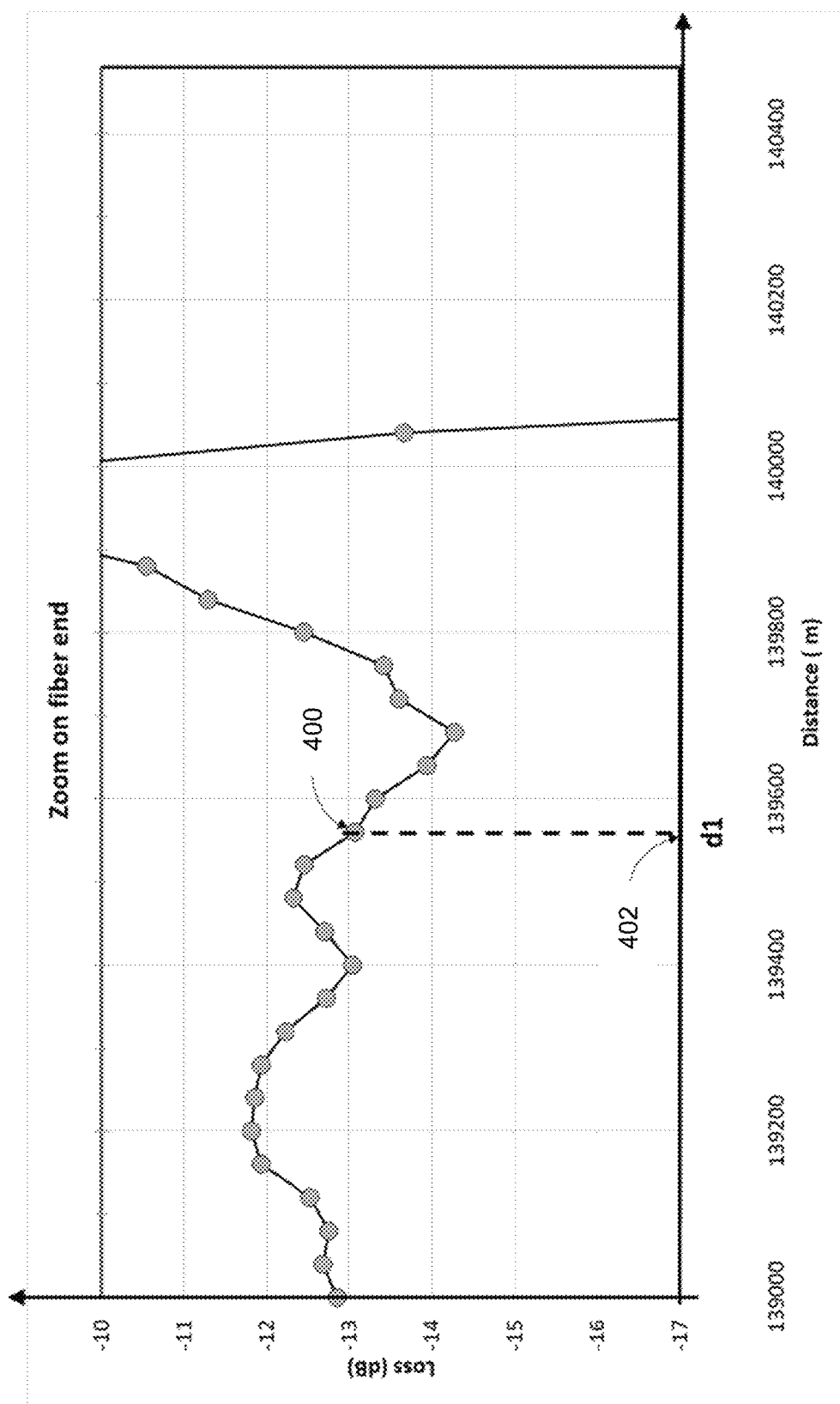
FIG. 4 illustrates an enlarged part of a fiber end with a noisy trace and a point loss measurement, in accordance with an example of the present disclosure.

FIG. 4 illustrates an enlarged part 306 of a fiber end with a noisy trace and a point loss measurement, in accordance with an example of the present disclosure. For example, the enlarged part 306 of the fiber end is shown with a noisy trace and the point loss measurement 400 at distance dl at 402 close to the fiber end. Any level fluctuation may translate in measurement errors.

Figure 5:
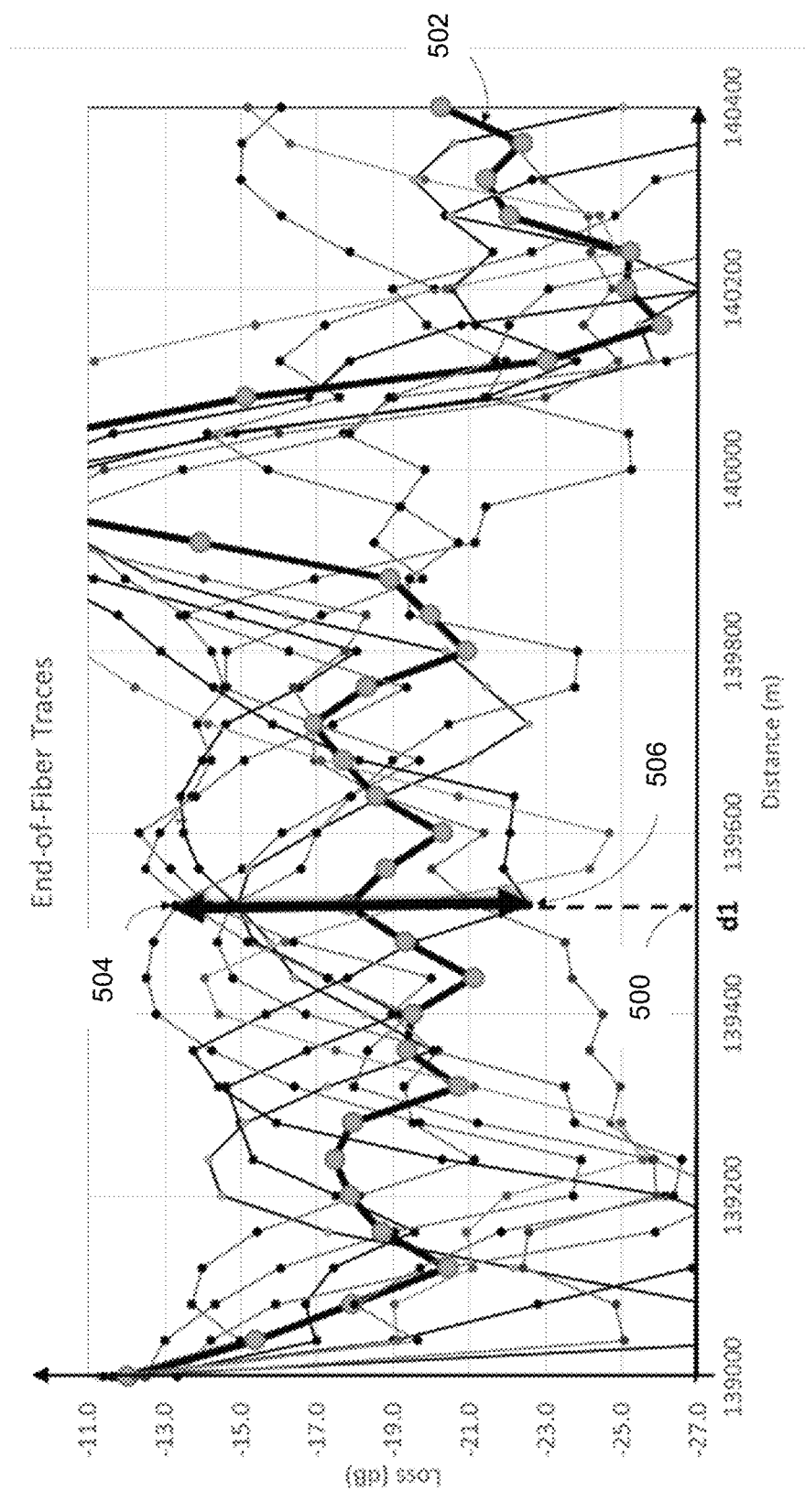
FIG. 5 illustrates a superposition of successive traces, in accordance with an example of the present disclosure.

FIG. 5 illustrates a superposition of successive traces, in accordance with an example of the present disclosure. Referring to FIG. 5, the superposition of 10 successive traces clearly illustrate the difficulty of level measurement at distance dl at 500. A first acquisition (e.g., trace 502) followed by nine other acquisitions under the same conditions are shown in FIG. 5. The superposition of these ten curves shows the variation of the loss measurement at distance dl whose dispersion over ten measurements varies by more than 4.5 dB between a maximum 504 and a minimum 506.

For the apparatuses, methods, and non-transitory computer readable media disclosed herein, in applications such as high-speed links interconnecting data centers, the detection of very short durations breaks in the continuity of the fiber optic link may be needed to facilitate the root cause analysis of traffic micro-interruptions, as well as to disqualify the physical support (e.g., fiber optic link).

In this regard, according to examples disclosed herein, the apparatuses, methods, and non-transitory computer readable media disclosed herein may enable the detection and location of a brief duration discontinuity in an optical fiber link.

According to examples disclosed herein, the apparatuses, methods, and non-transitory computer readable media disclosed herein may include a real-time detection (RTD) loop (implemented by an optical reflectometer controller, a comparison trace generator, and an event identifier as disclosed herein) that is fast enough not to miss very short fiber link interruptions.

According to examples disclosed herein, the apparatuses, methods, and non-transitory computer readable media disclosed herein may include a specific calibration phase that precedes a real-time detection phase. In this regard, an upstream analysis phase may be utilized to define the acquisition and test parameters of the detection loop for the location which will follow. In the event of a fault detection, the detection loop may be interrupted in order to start a localization process using the trace acquired during the detection loop.

According to examples disclosed herein, for the apparatuses, methods, and non-transitory computer readable media disclosed herein, the detection may be based on the comparison of the real-time detection OTDR trace with a reference trace acquired under normal conditions without time constraint during the analysis phase.

According to examples disclosed herein, for the apparatuses, methods, and non-transitory computer readable media disclosed herein, the comparison signal result of the difference between these two traces in logarithmic scale or their ratio if in linear scale may be subject to the presence of superimposed noise. In this regard, thresholds may be defined for detecting intermittent faults while avoiding false positives linked to the presence of noise on the comparison trace signal.

According to examples disclosed herein, for the apparatuses, methods, and non-transitory computer readable media disclosed herein, in order to reduce the impact of noise, fault detection may be implemented by using multiple zones along an optical fiber link. The data points all along comparison trace segments may be used to determine a comparison trace section level indicator that will be compared to a predefined threshold (e.g., the defined thresholds as disclosed herein).

According to examples disclosed herein, for the apparatuses, methods, and non-transitory computer readable media disclosed herein, the optical reflectometer may be an optical time domain or frequency domain reflectometer (e.g., OTDR, OFDR, Coherent OTDR, Coherent OFDR or Correlation OTDR).

For the apparatuses, methods, and non-transitory computer readable media disclosed herein, it is noted that an optical reflectometer may include an OTDR real-time mode, or an OTDR monitoring mode.

The real-time mode of the optical reflectometer may make it possible to chain acquisitions that are sufficiently brief to allow the real-time trace on the screen to be refreshed regularly. This optical reflectometer function does not authorize any localization of a fault, and does not allow the data of the acquisition points to be saved. An objective of this mode may include providing an overview of the fiber optic link before the launch of the OTDR monitoring mode, or just to visually follow any variations in real time. The real-time mode of the optical reflectometer as disclosed herein may thus effectively represent a "short duration" acquisition.

According to examples disclosed herein, the apparatuses, methods, and non-transitory computer readable media disclosed herein may thus determine a comparison trace based, for example, on a difference of a log reference trace and a log real-time trace. The comparison trace may then be used to determine a comparison trace section level indicator for each section as a mean value on each section of the comparison trace. A detection threshold for a section may be determined by statistical analysis of the comparison trace by section. The comparison trace section level indicator may then be compared to the detection threshold of the section to identify an event such as a fault in the fiber optic link being monitored.

For the apparatus, methods, and non-transitory computer readable media disclosed herein, the elements of the apparatus, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates an architectural layout of a fiber optic link intermittent fault detection and localization apparatus (hereinafter also referred to as "apparatus 100") in accordance with an example of the present disclosure.

Referring to FIG. 1, the apparatus 100 may include a fiber optic link analyzer 102 that is executed by at least one hardware processor (e.g., the hardware processor 1102 of FIG. 11, and/or the hardware processor 1304 of FIG. 13), to determine, for a fiber optic link 104 that is to be analyzed, at least one section 106 corresponding to the fiber optic link 104, at least one detection threshold 108 corresponding to the at least one section 106, and a reference trace 110 for the fiber optic link 104. In this regard, generally, two or more sections may be utilized along the length of the fiber optic link 104 to detect intermittent short duration faults.

According to examples disclosed herein, the fiber optic link analyzer 102 may determine, for the fiber optic link 104 that is to be analyzed, the reference trace 110 for the fiber optic link 104 by identifying, from a plurality of traces associated with the fiber optic link 104, a trace as the reference trace 110.

According to examples disclosed herein, the fiber optic link analyzer 102 may determine, for the fiber optic link 104 that is to be analyzed, the at least one section 106 corresponding to the fiber optic link 104 by determining, for the fiber optic link 104 that is to be analyzed, the at least one section 106 by positioning the at least one section 106 on a reflective event to modify a detection measurement range using Fresnel reflection (instead of Rayleigh backscatter).

An optical reflectometer controller 112 that is executed by at least one hardware processor (e.g., the hardware processor 1102 of FIG. 11, and/or the hardware processor 1304 of FIG. 13) may acquire, for the fiber optic link 104, a real-time trace 114. In order to minimize the duration of the real-time measurement, the real time trace 114 may be stored when a fault is detected.

According to examples disclosed herein, the optical reflectometer controller 112 may acquire, for the fiber optic link 104, the real-time trace 114 by acquiring, for the fiber optic link 104, the real-time trace 114 without any traffic on the fiber optic link 104.

According to examples disclosed herein, the optical reflectometer controller 112 may acquire, for the fiber optic link 104, the real-time trace 114 by acquiring, for the fiber optic link 104, the real-time trace using an available channel of a wavelength division multiplexing system.

A comparison trace generator 116 that is executed by at least one hardware processor (e.g., the hardware processor 1102 of FIG. 11, and/or the hardware processor 1304 of FIG. 13) may generate, based on analysis of the reference trace 110 and the real-time trace 114, a comparison trace 118 for the fiber optic link 104. Noise filtering may be applied on the comparison trace 118 before the determination of the comparison trace section level indicators (e.g., the at least one comparison trace section level indicator 122 as disclosed herein).

According to examples disclosed herein, the comparison trace generator 116 may generate, based on analysis of the reference trace 110 and the real-time trace 114, the comparison trace 118 for the fiber optic link 104 based on determination of a ratio between the real-time trace 114 and the reference trace 110 in a linear scale.

According to examples disclosed herein, the comparison trace generator 116 may generate, based on analysis of the reference trace 110 and the real-time trace 114, the comparison trace 118 for the fiber optic link 104, based on determination of a difference between the real-time trace 114 and the reference trace 110 in a logarithm scale.

An event identifier 120 that is executed by at least one hardware processor (e.g., the hardware processor 1102 of FIG. 11, and/or the hardware processor 1304 of FIG. 13) may identify, based on analysis of the at least one section 106 to determine whether at least one comparison trace section level indicator 122 determined from the comparison trace 118 exceeds the at least one detection threshold 108, an event 124 (e.g., an intermittent short duration fault) associated with the fiber optic link 104.

A comparison trace section level analyzer 126 that is executed by at least one hardware processor (e.g., the hardware processor 1102 of FIG. 11, and/or the hardware processor 1304 of FIG. 13) may generate, for the at least one section 106, the at least one comparison trace section level indicator 122.

According to examples disclosed herein, the comparison trace section level analyzer 126 may generate, for the at least one section 106, the at least one comparison trace section level indicator 122 by determining a statistical average of data points that form the at least one section 106 for the comparison trace 118.

A detection threshold analyzer 128 that is executed by at least one hardware processor (e.g., the hardware processor 1102 of FIG. 11, and/or the hardware processor 1304 of FIG. 13) may analyze, for the at least one section 106, the at least one comparison trace section level indicator 122 relative to the at least one detection threshold 108. Further, the detection threshold analyzer 128 may determine, based on the analysis of the at least one comparison trace section level indicator 122 relative to the at least one detection threshold 108, whether the at least one comparison trace section level indicator 122 exceeds the at least one detection threshold 108. In this regard, the event identifier 120 may identify, based on a determination that the at least one comparison trace section level indicator 122 exceeds the at least one detection threshold 108, the event 124 associated with the at least one comparison trace section level indicator 122.

A real-time trace analyzer 130 that is executed by at least one hardware processor (e.g., the hardware processor 1102 of FIG. 11, and/or the hardware processor 1304 of FIG. 13) may analyze, based on the determination that the at least one comparison trace section level indicator 122 exceeds the at least one detection threshold 108, the real-time trace 114. In this regard, the event identifier 120 may identify, based on the analysis of the real-time trace 114 to localize the event 124, the event 124 associated with the at least one comparison trace section level indicator 122.

According to examples disclosed herein, the optical reflectometer controller 112 may acquire, for the fiber optic link 104, the real-time trace 114 by acquiring, for the fiber optic link 104, the real-time trace 114 by an optical reflectometer 132 that includes an optical time domain reflectometer or an optical frequency domain reflectometer.

According to examples disclosed herein, the apparatus 100 may include a 1 by n optical switch 134 inserted between the optical reflectometer 132 and the fiber optic link 104 for event identification on the fiber optic link 104. Alternatively, the optical reflectometer 132 may be directly connected to the fiber optic link 104 if the optical switch 134 is not needed to lock onto a port corresponding to the fiber optic link 104 to be tested.

An event notifier 136 that is executed by at least one hardware processor (e.g., the hardware processor 1102 of FIG. 11, and/or the hardware processor 1304 of FIG. 13) may generate, based on the identification of the event 124 associated with the fiber optic link 104, a notification 138 of the event 124.

According to examples disclosed herein, the optical reflectometer controller 112 may acquire, based on a determination that the at least one comparison trace section level indicator 122 is less than the at least one detection threshold 108, a further real-time trace. Further, the comparison trace generator 116 may generate, based on analysis of the reference trace 110 and the further real-time trace 114, a further comparison trace for the fiber optic link 104.

Figure 6:
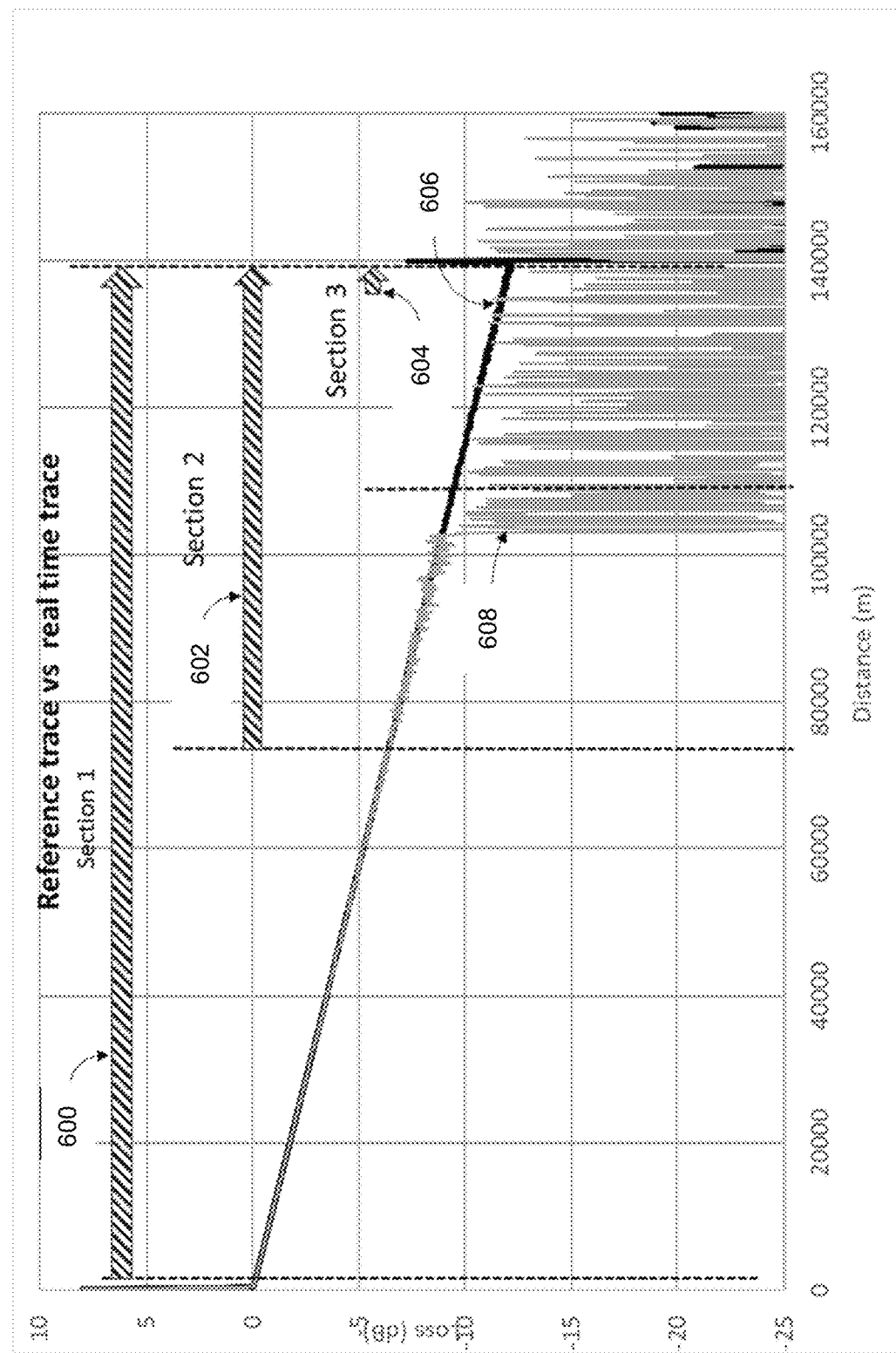
FIG. 6 illustrates an example of positioning of different sections of different lengths used for detection to illustrate operation of the apparatus of FIG. 1 in accordance with an example of the present disclosure.

FIG. 6 illustrates an example of positioning of different sections of different lengths used for detection to illustrate operation of the apparatus 100 in accordance with an example of the present disclosure. Referring to FIG. 6, a first section 600 may cover almost the entire length of the fiber optic link 104. A second section 602 may cover a second part of the fiber optic link 104, while the third section 604 may be positioned on a last part of the fiber optic link 104. The sections 600, 602, and 604 may be determined to cover the different cases of intermittent insertion losses that may occur along the fiber optic link 104. For example, a section positioned at the end of the fiber optic link 104 (e.g., the third section 604) may be mandatory for detecting faults near the end of the fiber optic link 104. However, since this zone for the third section 604 is relatively short and noisy, longer sections such as the first section 600 and the second section 602 may be added to cover areas further upstream. Thus, the first section 600 may make it possible to detect with greater sensitivity a fault which appeared at the start of the fiber optic link 104. In this regard, at least two sections (e.g., the first section 600 and the third section 604) may be positioned as shown, one allowing detection of breaks in a first half of the fiber optic link 104 with good signal-to-noise ratio, and the other allowing detection of breaks in the remaining part up to the end of the fiber optic link 104 with lower signal-to-noise ratio. A start of binding may be set at the beginning of the fiber optic link 104, and an end of binding may be set at the end of the fiber optic link 104. Thus, each fiber optic link 104 may include at least two sections at the minimum (e.g., beginning and end of the fiber optic link 104), and one or more additional sections to cover the different cases of intermittent insertion losses that may occur along the fiber optic link 104. For FIG. 6, trace 606 may represent the reference trace 110, and trace 608 may represent the real-time trace 114 including a fault located approximately 103 km from the origin.

During an analysis phase associated with the fiber optic link 104, data acquisitions may be performed by the fiber optic link analyzer 102 to obtain the reference trace 110, to define the sections (e.g., as shown in FIG. 6) that will be used for the real-time detection measurement, and to define the predefined detection thresholds used with respect to the sections.

With respect to the analysis phase, since the measurement time is not significant, the reference trace 110 may be acquired with a significant averaging time.

Figure 7:
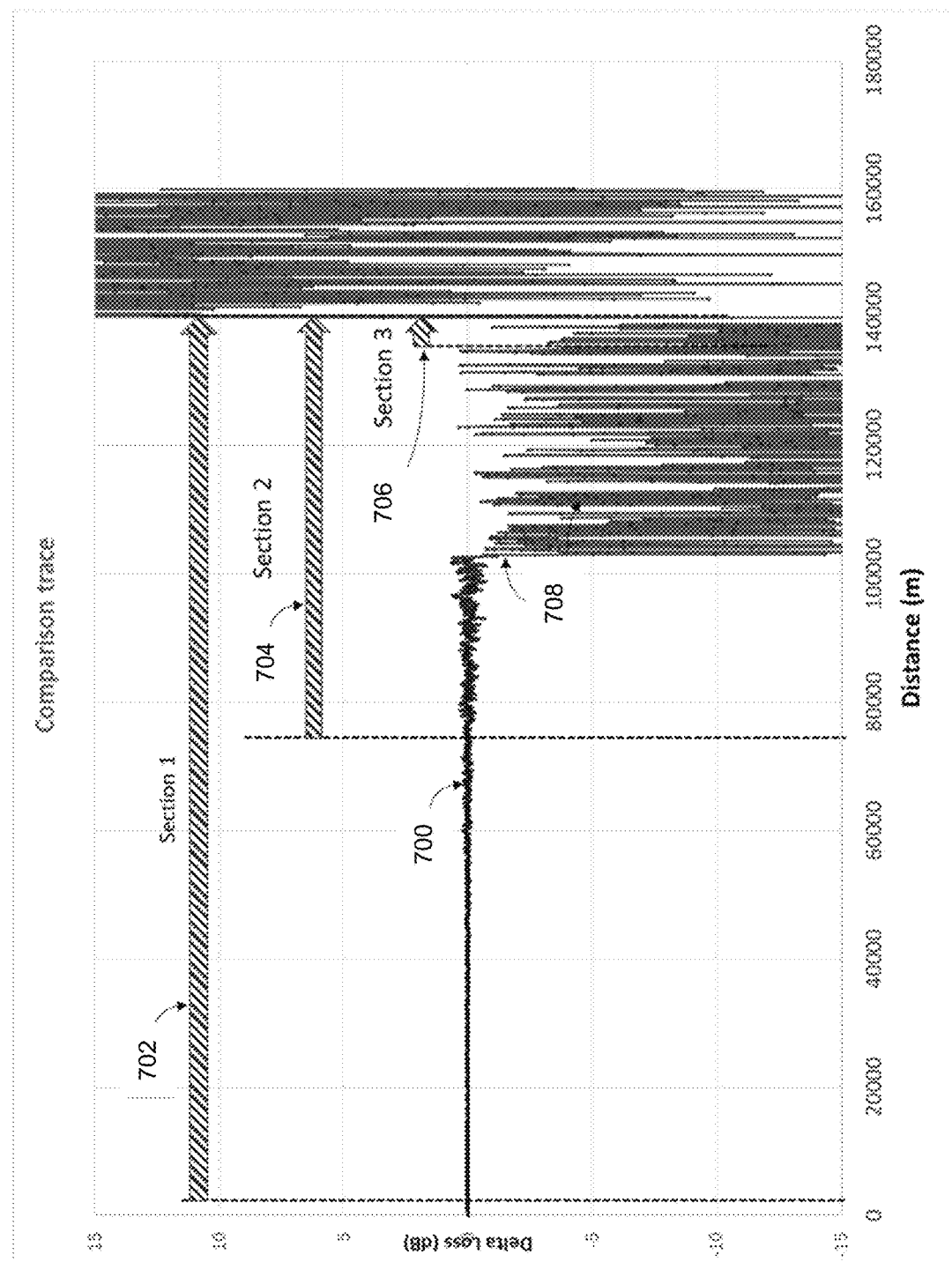
FIG. 7 illustrates determination of a comparison trace between a reference trace and a real-time trace to illustrate operation of the apparatus of FIG. 1 in accordance with an example of the present disclosure.

FIG. 7 illustrates determination of a comparison trace (e.g., the comparison trace 118) between the reference trace 110 and the real-time trace 114 to illustrate operation of the apparatus 100 in accordance with an example of the present disclosure. Referring to FIG. 7, the sections (e.g., section 106 and other sections) as disclosed herein may be used for determination of a comparison trace 700 between a reference trace and a real-time trace. A first section 702 may utilize all of the points of the comparison trace 700. A second section 704 and a last section 706 may use part of the points from the comparison trace 700. Each section may include its own predefined detection threshold taking into account the noise level and the length of the section. With respect to the predefined detection thresholds, the fiber optic link analyzer 102 may perform OTDR measurements to assess the natural variability of the predefined detection thresholds. The fiber optic link analyzer 102 may perform statistical measurements on the measurement noise of the comparison trace to determine the predefined detection thresholds to eliminate random triggering while maintaining good detection sensitivity. In one example, the predefined detection thresholds may be determined by determining a standard deviation of the measurement of the comparison trace and defining a predefined threshold calculated on n times this standard deviation. In the example of FIG. 7, with a fault located at approximately 103 km at 708, the last section 706 may be impacted over its entire length. The comparison signal after the end of the fiber optic link may not be taken into account during the detection phase as disclosed herein. The data from each section of the comparison trace may be compared to the predefined detection thresholds. In this regard, each section may group together a vector/array of data which will be used to obtain a representative value (e.g., the comparison trace section level indicator) of the section, and which will be compared to the detection thresholds. For example, the representative value may be determined from the average of the values of the comparison trace on the section.

In some examples, denoising techniques such as wavelet filtering may be applied to the comparison trace 700 in order to improve the signal-to-noise ratio. Most signal processing techniques may be improved if applied to a differential curve that is essentially event-free and flat over the entire distance range. Alternatively, the rich spectral content of the two original reflectometric traces, containing multiple events and varying slopes, may need to be performed in a manner to avoid distortions. These digital processing operations may need to be selected, in particular in relation to their processing time, so as not to significantly impact the duration of the real-time detection phase as disclosed herein.

In the example of FIG. 7, the fault (e.g., event 124 as disclosed herein) may be located at a distance of approximately 103 km. For example, the fault may be located closer to the end of the fiber optic link 104. Thus, a fault located at the start of the fiber optic link 104 may be detected with greater sensitivity by using the measurement on the first section 702. Similarly, the detection of a fault very close to the end located at 140 km may be based on the measurement of the third section 706.

The use of different measurement zones may make it possible to obtain different sensitivities in terms of detection. The time for this analysis phase implemented by the fiber optic link analyzer 102 may be used to determine the best compromise between sensitivity and speed of the detection phase implemented by the optical reflectometer controller 112, the comparison trace generator 116, and the event identifier 120. The search for the number and the positioning of the different sections as well as the optimal value of the detection thresholds may implement different learning and/or statistical analysis and filtering techniques. Thus, several or even many OTDR acquisitions may be carried out in order to obtain an optimized reference trace 110 which will then be used for the comparison. Likewise, several or even many real-time traces may be used to determine the acquisition parameters and the detection thresholds. Artificial intelligence techniques may also be utilized for the analysis phase implemented by the fiber optic link analyzer 102, which precede the detection phase implemented by the optical reflectometer controller 112, the comparison trace generator 116, and the event identifier 120.

In the case of presence of reflective events on a trace (e.g., the reference trace 110 and the real-time trace 114), the zones may exclude, if needed, the data points of these events. The reflective events including events such as those generated by optical sensors may be excluded from the comparison because the peaks corresponding to these reflective events may see their amplitude vary without there being a significant variation in their insertion loss. In some cases, an open optical connector exhibiting a reflectance greater than that exhibited when connected may generate a signal large enough to interfere with the measurement based on the backscatter signal. If the sections do not include the data points corresponding to these reflective events, they may no longer have any impact on the OTDR measurements.

In the event of the presence of reflective events on the fiber optic link 104 generated, for example, by optical connectors, the data points corresponding to these events may be excluded for the calculation on these same zones.

Conversely, these points may be retained on a reflection of a fiber end to detect possible problems at the very end of the fiber optic link 104 (e.g., optical connection issue generating reflectance variation).

In the real-time detection mode implemented by the optical reflectometer controller 112, the comparison trace generator 116, and the event identifier 120, an acquisition buffer may not be stored because of data volume and the high-speed measurement requirement.

Figure 8:
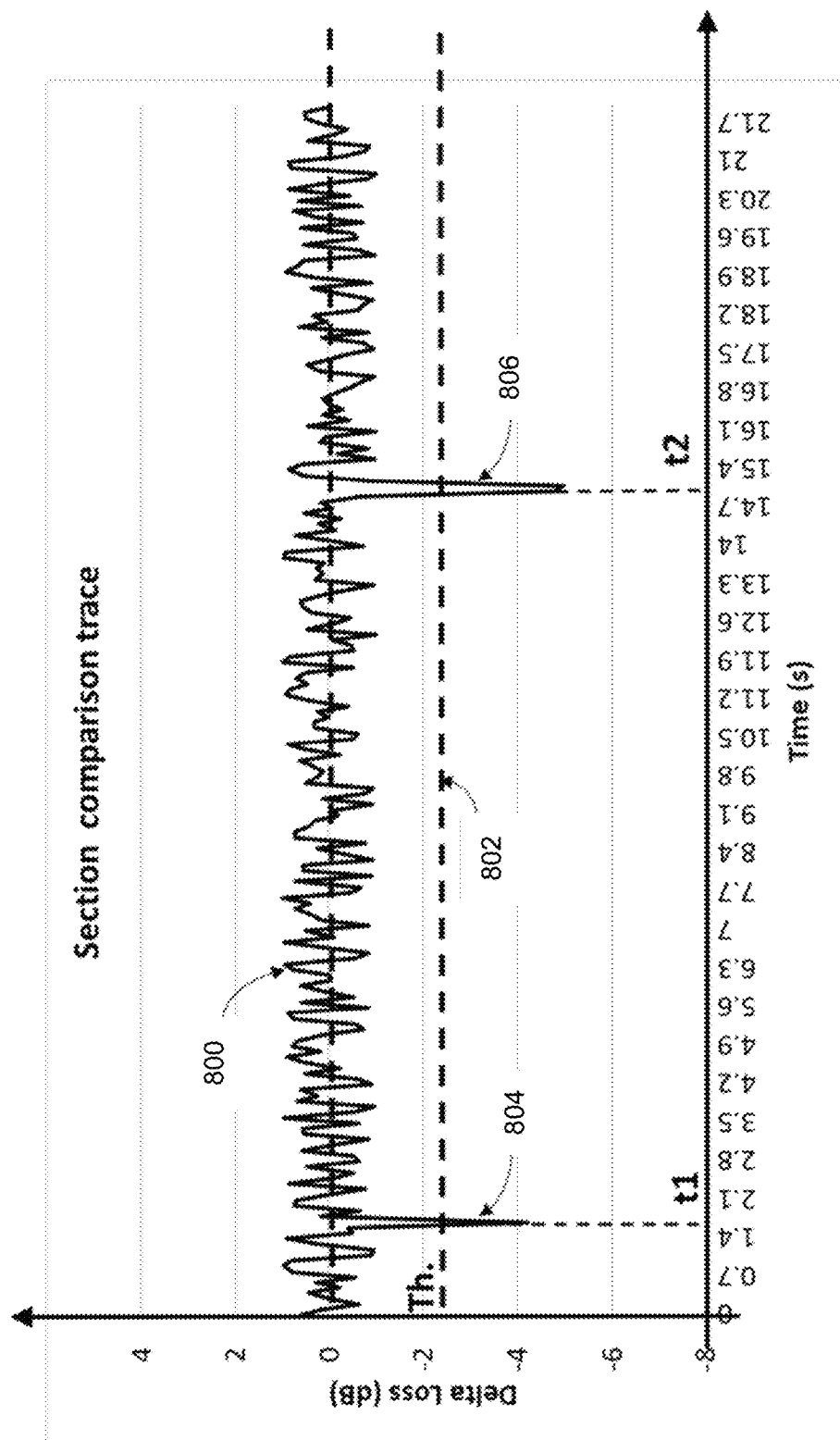
FIG. 8 illustrates an example of time variation of a comparison trace section level indicator and detection of temporary crossings of a detection threshold to illustrate operation of the apparatus of FIG. 1 in accordance with an example of the present disclosure.

FIG. 8 illustrates an example of time variation of a comparison trace section level indicator 122 and detection of temporary crossings of the detection threshold 108 to illustrate operation of the apparatus 100 in accordance with an example of the present disclosure. Referring to FIG. 8, for the example of the time variation of the comparison trace section level indicator 800 and the detection of temporary crossings of the detection threshold 802, micro-interruption of the continuity of the fiber optic link are detected at times t1 at 804 and time t2 at 806. It is noted that FIG. 8 represents a general example of how the comparison trace section level indicator 122, which is continuously updated, may vary in time, and does not specifically refer to the sections of FIG. 6 or 7. In this regard, FIG. 8 shows the successive determination of the comparison trace section level indicator 122 fluctuating over time, and that the detection threshold used may be positioned so as not to trigger on the measurement noise associated with the comparison trace section level indicator 122.

The monitoring normalized data for FIG. 8 may be compiled, tracked, and analyzed through a computerized monitoring system implemented by the apparatus 100 to be correlated in time with other events that are detected.

The detection of the crossing of the detection threshold 108 may trigger the second part of the process implemented by the apparatus 100 which includes using the data of the real-time trace 114 to locate the variation of optical power using the event detection capability of the optical reflectometer 132.

Figure 9:
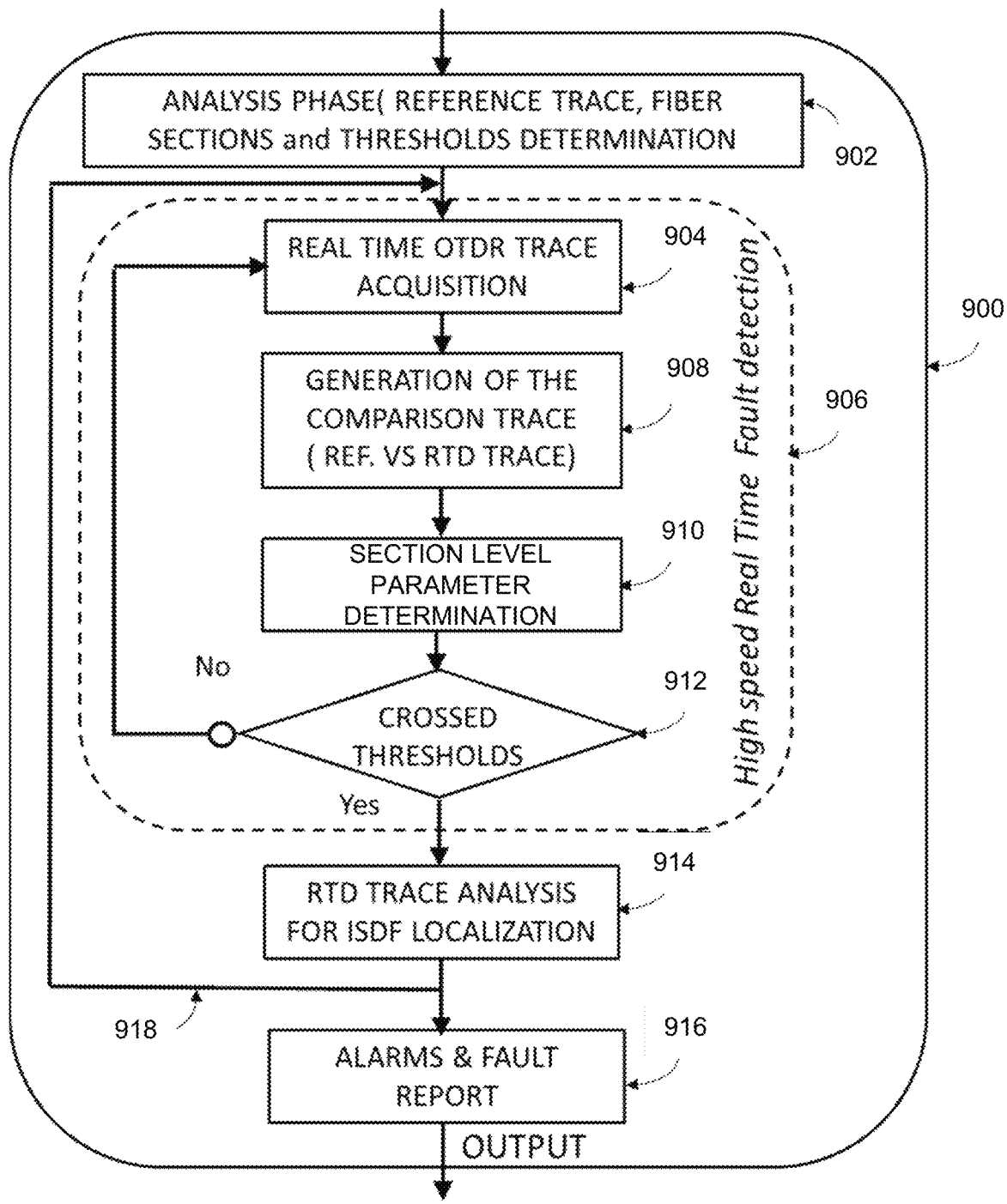
FIG. 9 illustrates a flowchart for fiber optic link intermittent fault detection and localization to illustrate operation of the apparatus of FIG. 1 in accordance with an example of the present disclosure.

FIG. 9 illustrates a flowchart 900 for fiber optic link intermittent fault detection and localization to illustrate operation of the apparatus 100 in accordance with an example of the present disclosure.

Referring to FIG. 9, at block 902 which represents the analysis phase implemented by the fiber optic link analyzer 102, during the analysis phase, sections (e.g., including the section 106), the detection thresholds (e.g., including the detection threshold 108) and the reference trace 110 may be defined for the fiber optic link 104.

Block 904 which represents the rapid OTDR acquisition of the real-time trace 114 may represent the first step of a real-time detection phase 906.

The acquisition of OTDR data points in real-time mode at 904 may be limited to a few hundred microseconds of duration, and may be followed by the generation of the comparison trace 118 at 908 obtained from the reference trace 110 generated during the analysis phase and the current real-time trace 114.

The process continues at block 910 with the determination of a comparison trace section level indicator 122 for each section. The comparison trace section level indicator 122 of a section may be obtained by determining the statistical average of the data points making up the section of the comparison trace. With respect to the comparison trace section level indicator 122, the fiber optic link analyzer 102 may perform measurements to assess the natural variability of the comparison trace section level indicator 122. The fiber optic link analyzer 102 may perform statistical measurements on the measurement noise of the comparison trace, to determine the predefined detection thresholds to eliminate random triggering while maintaining good detection sensitivity. In one example, the predefined detection thresholds may be determined by determining a standard deviation of the measurement of the comparison trace and defining a predefined threshold calculated on n times this standard deviation.

At block 912, the comparison trace section level indicator 122 of each section may be tested by the event identifier 120 against the predefined detection thresholds (e.g., the detection threshold 108 for a corresponding section 106). For example, using the general example of FIG. 8, the comparison trace section level indicator 122 of the section varies around 0 dB with a noise envelope of around 1 dBpp (e.g., 800 of FIG. 8). The "Th." detection threshold 108 defined for this section may be specified at approximately −2.2 dB. Under these conditions, the comparison trace section level indicator 122 may cross the threshold at t1 and t2 (804, 806).

The process continues with block 904 with a new acquisition if any of the detection thresholds are not crossed. Alternatively, at block 914, in case of crossing one or several detection thresholds (e.g., as shown at 804 and 806 of FIG. 8), the full data of the real-time trace 114 may be stored and used for the localization of the event at 914 by the optical reflectometer 132.

At block 916, the event notifier 136 may generate, based on the identification of the event 124 associated with the fiber optic link 104, the notification 138 of the event 124. Following the location process at block 914, the flow of FIG. 9 may loop back to the real-time acquisition at block 904 by the branch 918.

Figure 10:
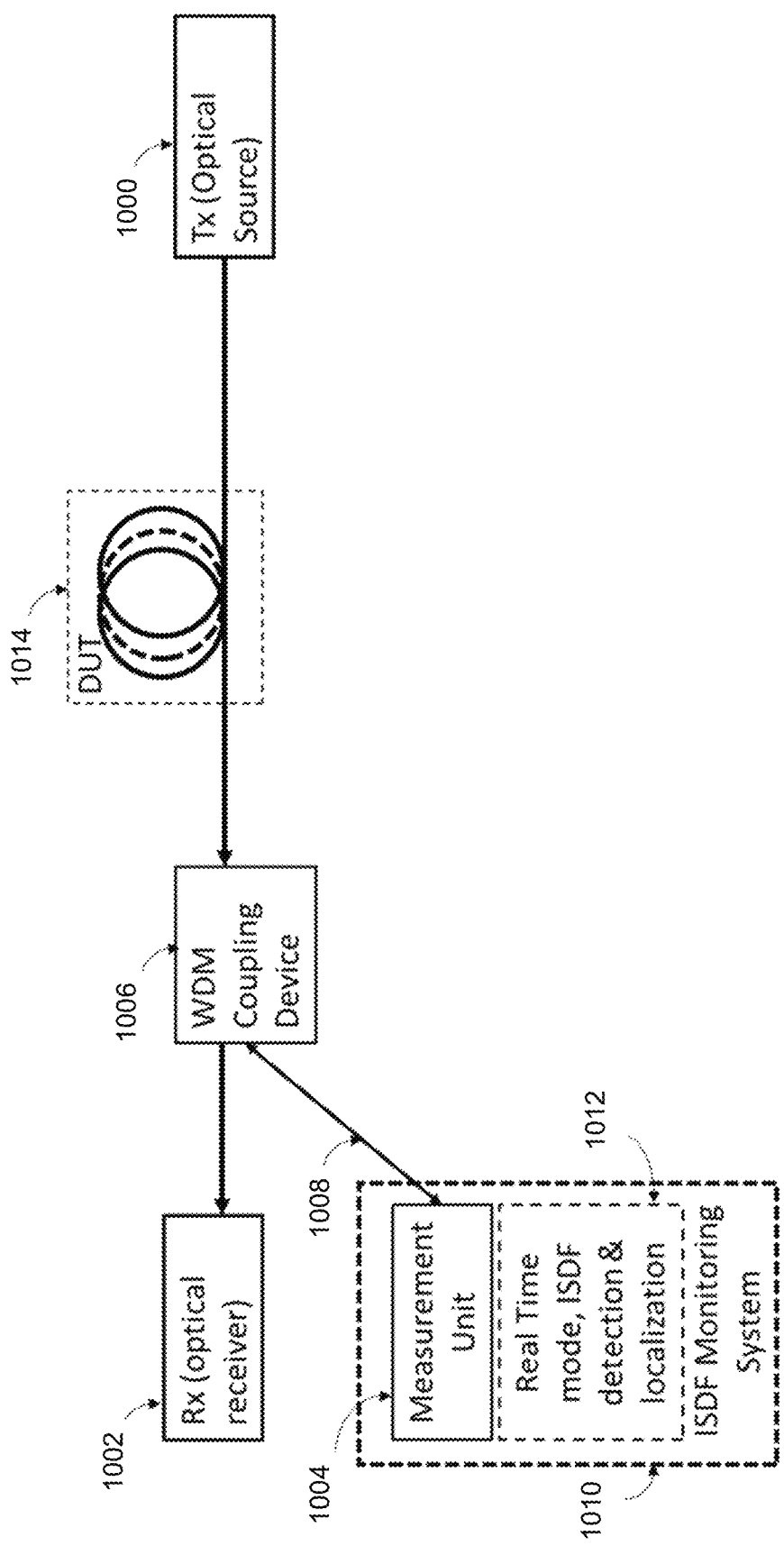
FIG. 10 illustrates an in-service arrangement to illustrate operation of the apparatus of FIG. 1 in accordance with an example of the present disclosure.

FIG. 10 illustrates an in-service arrangement to illustrate operation of the apparatus 100 in accordance with an example of the present disclosure. Referring to FIG. 10, a fiber optic link may connect an optical source (Tx) at 1000, to an optical receiver Rx at 1002. An OTDR measurement unit 1004 (e.g., the optical reflectometer 132) operating in a different optical wavelength outside the traffic wavelength may be connected to the fiber optic link 104 by an optical coupling device 1008 and a coupling device using wavelength division multiplexing.

The OTDR measurement unit 1004 may be connected to coupling device 1006 by an optical link 1008. The apparatus 100, which may also be referred to as intermittent and short duration faults (ISDF) monitoring system 1010, may embed a software processing unit 1012 that drives the real time measurement, the event detection and the localization process (e.g., as implemented by the optical reflectometer controller 112, the comparison trace generator 116, and the event identifier 120).

The optical connection between the coupling device 1006 and the measurement unit 1004 may be used to compensate for fluctuation of an OTDR launch signal, but also may be used as a launch cable to avoid OTDR attenuation dead zone masking of the near end of the fiber optic link 104 (also referred to as device-under-test (DUT) 1014). In this regard, since the optical link 1008 is not part of the fiber optic link 104 under test, defining a section that covers the length of this optical line 1008 may be used to detect any problem on this optical line 1008 so as not to mistakenly associate an optical line 1008 fault with the fiber optic link 104 under surveillance.

A possible configuration using an optical switch 134 inserted in the link 1008 may make possible the on-demand detection of intermittent events, such as faults, by locking the optical switch 134 on the port corresponding to the link to be tested.

Figure 11:
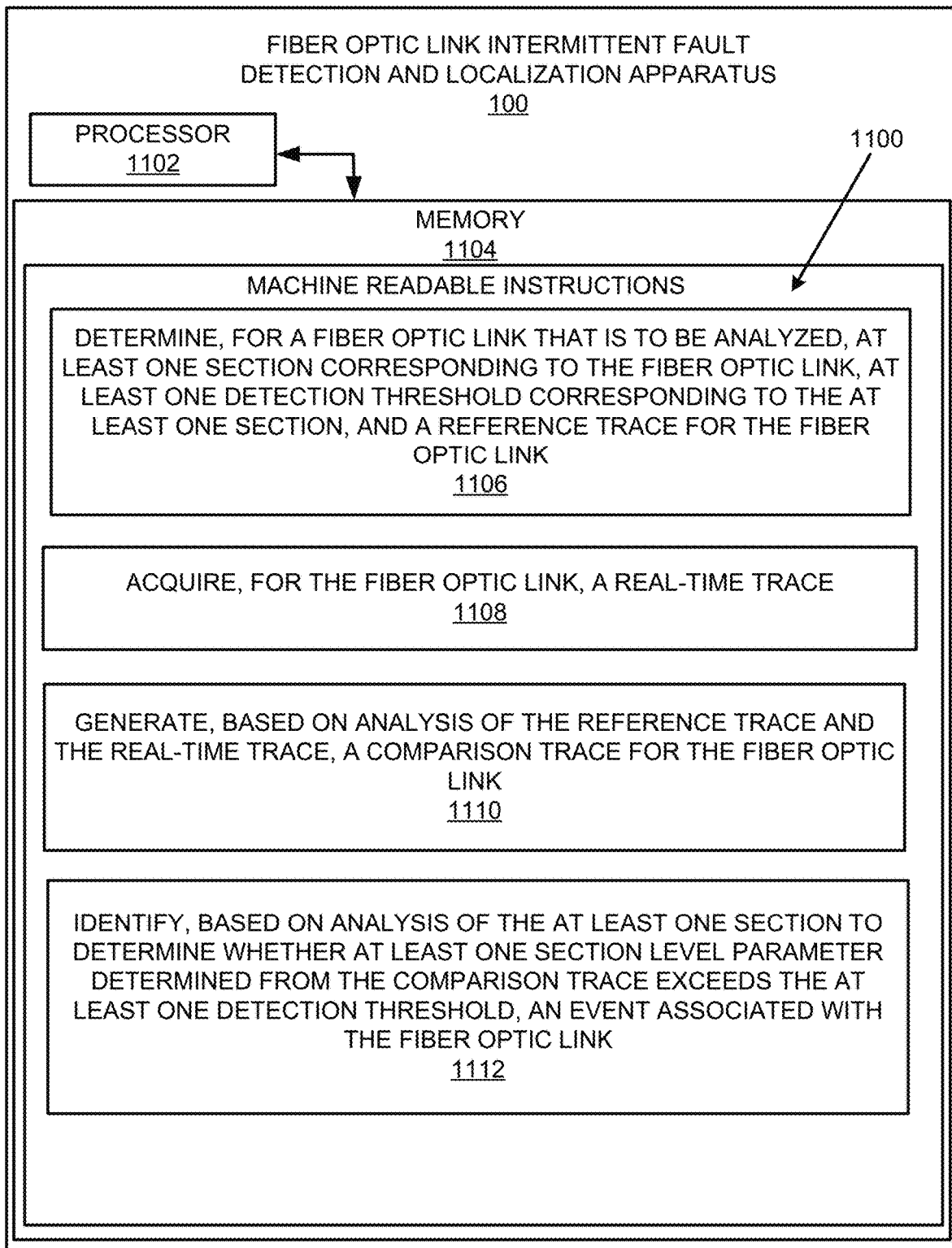
FIG. 11 illustrates an example block diagram for fiber optic link intermittent fault detection and localization in accordance with an example of the present disclosure.
Figure 13:
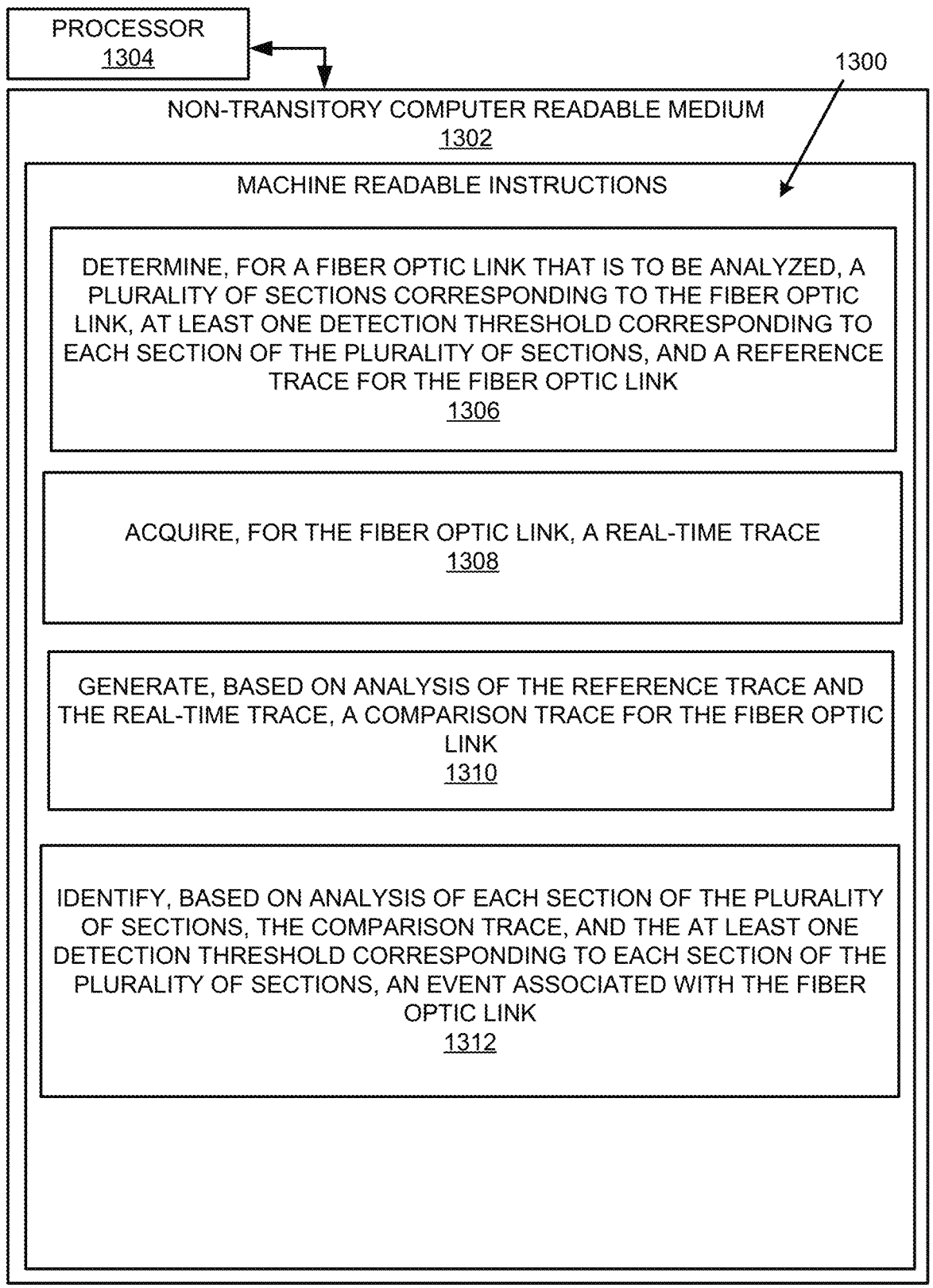
FIG. 13 illustrates a further example block diagram for fiber optic link intermittent fault detection and localization in accordance with another example of the present disclosure.

FIGS. 11-13 respectively illustrate an example block diagram 1100, a flowchart of an example method 1200, and a further example block diagram 1300 for fiber optic link intermittent fault detection and localization, according to examples. The block diagram 1100, the method 1200, and the block diagram 1300 may be implemented on the apparatus 100 described above with reference to FIG. 1 by way of example and not of limitation. The block diagram 1100, the method 1200, and the block diagram 1300 may be practiced in other apparatuses. In addition to showing the block diagram 1100, FIG. 11 shows hardware of the apparatus 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent an example method for fiber optic link intermittent fault detection and localization, and the steps of the method. FIG. 13 may represent a non-transitory computer readable medium 1302 having stored thereon machine readable instructions to provide fiber optic link intermittent fault detection and localization according to an example. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to determine, for a fiber optic link 104 that is to be analyzed, at least one section 106 corresponding to the fiber optic link 104, at least one detection threshold 108 corresponding to the at least one section 106, and a reference trace 110 for the fiber optic link 104.

The processor 1102 may fetch, decode, and execute the instructions 1108 to acquire, for the fiber optic link 104, a real-time trace 114.

The processor 1102 may fetch, decode, and execute the instructions 1110 to generate, based on analysis of the reference trace 110 and the real-time trace 114, a comparison trace 118 for the fiber optic link 104.

The processor 1102 may fetch, decode, and execute the instructions 1112 to identify, based on analysis of the at least one section 106 to determine whether at least one comparison trace section level indicator 122 determined from the comparison trace 118 exceeds the at least one detection threshold 108, an event 124 associated with the fiber optic link 104.

Referring to FIGS. 1-10 and 12, and particularly FIG. 12, for the method 1200, at block 1202, the method may include determining, for a fiber optic link 104 that is to be analyzed, at least one section 106 corresponding to the fiber optic link 104, at least one detection threshold 108 corresponding to the at least one section 106, and a reference trace 110 for the fiber optic link 104.

At block 1204, the method may include acquiring, for the fiber optic link 104, a real-time trace 114.

At block 1206, the method may include generating, based on analysis of the reference trace 110 and the real-time trace 114, a comparison trace 118 for the fiber optic link 104.

At block 1208, the method may include identifying, based on analysis of the at least one section 106, the comparison trace 118, and the at least one detection threshold 108, an event 124 associated with the fiber optic link 104.

Referring to FIGS. 1-10 and 13, and particularly FIG. 13, for the block diagram 1300, the non-transitory computer readable medium 1302 may include instructions 1306 to determine, for a fiber optic link 104 that is to be analyzed, a plurality of sections corresponding to the fiber optic link 104, at least one detection threshold 108 corresponding to each section of the plurality of sections, and a reference trace 110 for the fiber optic link 104.

The processor 1304 may fetch, decode, and execute the instructions 1308 to acquire, for the fiber optic link 104, a real-time trace 114.

The processor 1304 may fetch, decode, and execute the instructions 1310 to generate, based on analysis of the reference trace 110 and the real-time trace 114, a comparison trace 118 for the fiber optic link 104.

The processor 1304 may fetch, decode, and execute the instructions 1312 to identify, based on analysis of each section of the plurality of sections, the comparison trace 118, and the at least one detection threshold 108 corresponding to each section of the plurality of sections, an event 124 associated with the fiber optic link 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
    a fiber optic link analyzer, executed by at least one hardware processor, to
        determine, for a fiber optic link that is to be analyzed,
            at least one section corresponding to the fiber optic link,
            at least one detection threshold corresponding to the at least one section, and
            a reference trace for the fiber optic link;

an optical reflectometer controller, executed by the at least one hardware processor, to
acquire, for the fiber optic link, a real-time trace;
a comparison trace generator, executed by the at least one hardware processor, to
generate, based on analysis of the reference trace and the real-time trace, a comparison trace for the fiber optic link; and
an event identifier, executed by the at least one hardware processor, to
identify, based on analysis of the at least one section to determine whether at least one section level parameter determined from the comparison trace exceeds the at least one detection threshold, an event associated with the fiber optic link.

2. The apparatus according to claim 1, further comprising:
a section level analyzer, executed by the at least one hardware processor, to
generate, for the at least one section, the at least one section level parameter;
a detection threshold analyzer, executed by the at least one hardware processor, to
analyze, for the at least one section, the at least one section level parameter relative to the at least one detection threshold, and
determine, based on the analysis of the at least one section level parameter relative to the at least one detection threshold, whether the at least one section level parameter exceeds the at least one detection threshold,
wherein the event identifier is executed by the at least one hardware processor to identify, based on analysis of the at least one section to determine whether the at least one section level parameter determined from the comparison trace exceeds the at least one detection threshold, the event associated with the fiber optic link by:
identifying, based on a determination that the at least one section level parameter exceeds the at least one detection threshold, the event associated with the at least one section level parameter.

3. The apparatus according to claim 2, further comprising:
a real-time trace analyzer, executed by the at least one hardware processor, to
analyze, based on the determination that the at least one section level parameter exceeds the at least one detection threshold, the real-time trace,
wherein the event identifier is executed by the at least one hardware processor to identify, based on the determination that the at least one section level parameter exceeds the at least one detection threshold, the event associated with the at least one section level parameter by:
identifying, based on the analysis of the real-time trace to localize the event, the event associated with the at least one section level parameter.

4. The apparatus according to claim 2, wherein the section level analyzer is executed by the at least one hardware processor to generate, for the at least one section, the at least one section level parameter by:
determining a statistical average of data points that form the at least one section for the comparison trace.

5. The apparatus according to claim 1, wherein the optical reflectometer controller is executed by the at least one hardware processor to acquire, for the fiber optic link, the real-time trace by:
acquiring, for the fiber optic link, the real-time trace by an optical reflectometer that includes an optical time domain reflectometer or an optical frequency domain reflectometer.

6. The apparatus according to claim 5, further comprising:
a 1 by n optical switch inserted between the optical reflectometer and the fiber optic link for event identification on the fiber optic link.

7. The apparatus according to claim 1, further comprising:
an event notifier, executed by the at least one hardware processor, to
generate, based on the identification of the event associated with the fiber optic link, a notification of the event.

8. The apparatus according to claim 1, wherein
the optical reflectometer controller is executed by the at least one hardware processor to:
acquire, based on a determination that the at least one section level parameter is less than the at least one detection threshold, a further real-time trace, and
the comparison trace generator is executed by the at least one hardware processor to:
generate, based on analysis of the reference trace and the further real-time trace, a further comparison trace for the fiber optic link.

9. The apparatus according to claim 1, wherein the fiber optic link analyzer is executed by at least one hardware processor to determine, for the fiber optic link that is to be analyzed, the reference trace for the fiber optic link by:
identifying, from a plurality of traces associated with the fiber optic link, a trace as the reference trace.

10. The apparatus according to claim 1, wherein the comparison trace generator is executed by the at least one hardware processor to generate, based on analysis of the reference trace and the real-time trace, the comparison trace for the fiber optic link by:
generating, based on determination of a ratio between the real-time trace and the reference trace in a linear scale, the comparison trace for the fiber optic link.

11. The apparatus according to claim 1, wherein the comparison trace generator is executed by the at least one hardware processor to generate, based on analysis of the reference trace and the real-time trace, the comparison trace for the fiber optic link by:
generating, based on determination of a ratio between the real-time trace and the reference trace in a logarithm scale, the comparison trace for the fiber optic link.

12. The apparatus according to claim 1, wherein the fiber optic link analyzer is executed by at least one hardware processor to determine, for the fiber optic link that is to be analyzed, the at least one section corresponding to the fiber optic link by:
determining, for the fiber optic link that is to be analyzed, the at least one section by positioning the at least one section on a reflective event to modify a detection measurement range using Fresnel reflection.

13. The apparatus according to claim 1, wherein the optical reflectometer controller is executed by the at least one hardware processor to acquire, for the fiber optic link, the real-time trace by:
acquiring, for the fiber optic link, the real-time trace without any traffic on the fiber optic link.

14. The apparatus according to claim 1, wherein the optical reflectometer controller is executed by the at least one hardware processor to acquire, for the fiber optic link, the real-time trace by:

acquiring, for the fiber optic link, the real-time trace using an available channel of a wavelength division multiplexing system.

15. A method comprising:
determining, by at least one hardware processor, for a fiber optic link that is to be analyzed,
at least one section corresponding to the fiber optic link by positioning the at least one section on a reflective event to modify a detection measurement range using Fresnel reflection,
at least one detection threshold corresponding to the at least one section, and
a reference trace for the fiber optic link;
acquiring, by the at least one hardware processor, for the fiber optic link, a real-time trace;
generating, by the at least one hardware processor, based on analysis of the reference trace and the real-time trace, a comparison trace for the fiber optic link; and
identifying, by the at least one hardware processor, based on analysis of the at least one section, the comparison trace, and the at least one detection threshold, an event associated with the fiber optic link.

16. The method according to claim 15, wherein the event includes a fault associated with the fiber optic link.

17. A non-transitory computer readable medium having stored thereon machine readable instructions, the machine readable instructions, when executed by at least one hardware processor, cause the at least one hardware processor to:
determine, for a fiber optic link that is to be analyzed,
a plurality of sections corresponding to the fiber optic link,
at least one detection threshold corresponding to each section of the plurality of sections, and
a reference trace for the fiber optic link;
acquire, for the fiber optic link, a real-time trace;
generate, based on analysis of the reference trace and the real-time trace, a comparison trace for the fiber optic link; and
identify, based on analysis of each section of the plurality of sections, the comparison trace, and the at least one detection threshold corresponding to each section of the plurality of sections, an event associated with the fiber optic link.

18. The non-transitory computer readable medium according to claim 17, wherein the machine readable instructions, when executed by the at least one hardware processor, further cause the at least one hardware processor to:
monitor a plurality of reflective devices installed along the fiber optic link to identify the event associated with the fiber optic link.

19. The non-transitory computer readable medium according to claim 17, wherein the machine readable instructions to identify, based on analysis of each section of the plurality of sections, the comparison trace, and the at least one detection threshold corresponding to each section of the plurality of sections, the event associated with the fiber optic link, when executed by at least one hardware processor, further cause the at least one hardware processor to:
generate, for each section of the plurality of sections, at least one section level parameter;
analyze, for each section of the plurality of sections, the at least one section level parameter relative to the at least one detection threshold;
determine, based on the analysis of the at least one section level parameter relative to the at least one detection threshold, whether the at least one section level parameter exceeds the at least one detection threshold; and
identify, based on a determination that the at least one section level parameter exceeds the at least one detection threshold, the event associated with the at least one section level parameter.

20. The non-transitory computer readable medium according to claim 19, wherein the machine readable instructions to generate, for each section of the plurality of sections, at least one section level parameter, when executed by the at least one hardware processor, further cause the at least one hardware processor to:
determine, for each section of the plurality of sections, a statistical average of data points that form a corresponding section for the comparison trace.

* * * * *